(12) United States Patent
Watanabe

(10) Patent No.: US 8,894,455 B2
(45) Date of Patent: Nov. 25, 2014

(54) OUTBOARD MOTOR

(75) Inventor: Toshio Watanabe, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 134 days.

(21) Appl. No.: 13/397,848

(22) Filed: Feb. 16, 2012

(65) Prior Publication Data

US 2012/0214367 A1 Aug. 23, 2012

(30) Foreign Application Priority Data

Feb. 17, 2011 (JP) ................................. 2011-032386
Feb. 17, 2011 (JP) ................................. 2011-032387

(51) Int. Cl.
*B63H 20/32* (2006.01)
*F02M 35/10* (2006.01)
*F02M 35/16* (2006.01)

(52) U.S. Cl.
CPC ............ *F02M 35/168* (2013.01); *B63H 20/32* (2013.01); *F02M 35/10013* (2013.01); *Y02T 10/146* (2013.01); *F02M 35/10262* (2013.01)
USPC .......................................................... 440/77

(58) Field of Classification Search
USPC .......................................... 440/77, 76, 88 A
See application file for complete search history.

(56) References Cited

U.S. PATENT DOCUMENTS

| | | | | |
|---|---|---|---|---|
| 4,952,180 A * | 8/1990 | Watanabe et al. | ............... | 440/77 |
| 5,115,784 A * | 5/1992 | Mito et al. | ................... | 123/516 |
| 5,340,343 A * | 8/1994 | Kawamukai et al. | ........... | 440/77 |
| 5,573,436 A * | 11/1996 | Trudeau et al. | ................. | 440/77 |
| 6,719,597 B2 * | 4/2004 | Yoshioka et al. | ............... | 440/77 |
| 6,899,579 B1 * | 5/2005 | Bruestle | ...................... | 440/88 A |
| 7,118,432 B2 * | 10/2006 | Katayama | ....................... | 440/77 |
| 7,247,065 B2 * | 7/2007 | Ito | ................................... | 440/77 |
| 7,267,591 B2 * | 9/2007 | Kimura et al. | ................. | 440/77 |
| 7,517,265 B2 * | 4/2009 | Takahashi et al. | .............. | 440/77 |
| 7,524,224 B2 | 4/2009 | Ide et al. | | |
| 7,572,159 B2 * | 8/2009 | Ide et al. | .................... | 440/88 A |
| 7,934,964 B2 * | 5/2011 | Fukuoka | ........................ | 440/76 |
| 2004/0229528 A1 | 11/2004 | Yazaki | | |
| 2007/0054569 A1 | 3/2007 | Murai | | |
| 2007/0266988 A1 * | 11/2007 | Ishizaka et al. | ........... | 123/198 E |
| 2008/0081523 A1 | 4/2008 | Ide et al. | | |
| 2012/0214367 A1 * | 8/2012 | Watanabe | ...................... | 440/77 |

FOREIGN PATENT DOCUMENTS

JP 2007-8416 A 1/2007
JP 2008-88881 A 4/2008

OTHER PUBLICATIONS

Extended European Search Report (EESR), dated Jul. 19, 2012, which issued during the prosecution of European Patent Application No. 12155516.3, which corresponds to the present application.

* cited by examiner

*Primary Examiner* — Lars A Olson
*Assistant Examiner* — Jovon Hayes
(74) *Attorney, Agent, or Firm* — Troutman Sanders LLP

(57) ABSTRACT

In an outboard motor having an engine unit housed in an engine room formed by an exterior cover, a protruding portion is projectingly formed on the upper surface of an engine cover covering the upper portion of the outboard motor, and an outside air inlet opened to face forward is provided at the protruding portion.

7 Claims, 9 Drawing Sheets

OUTBOARD MOTOR

CROSS-REFERENCE TO RELATED APPLICATIONS

This application is based upon and claims the benefit of priority of the prior Japanese Patent Application No. 2011-032386, filed on Feb. 17, 2011, and the Japanese Patent Application No. 2011-032387, filed on Feb. 17, 2011, the entire contents of which are incorporated herein by reference.

BACKGROUND OF THE INVENTION

1. Field of the Invention

The present invention relates to an outboard motor. In particular, the present invention relates to an outboard motor including an engine cover provided with an outside air inlet and an intake device supplying combustion air to an engine.

2. Description of the Related Art

There are known various techniques for preventing water mixed in combustion air from intruding into a combustion chamber in an outboard motor including an internal combustion engine housed in an engine room formed by an engine cover. In particular, the internal combustion engine mounted on a propulsion unit such as the outboard motor or the like is required to have a compact and excellent function of preventing intrusion of water.

Conventionally, for example, outboard motors described in Patent Documents 1, 2 and so on are configured such that when water is mixed in the combustion air flowed therein from the intake port of the intake passage, the water is separated from the combustion air by the centrifugal force in an inversion flow passage for the purpose of improving the effect of preventing intrusion of water into the combustion chamber of the internal combustion engine and the efficiency of filling the intake air. It is also intended to suppress heated air flowing into the engine room from the intake port of the intake passage to suppress an increase in temperature of the combustion air so as to improve the filling efficiency.

Patent Document 1: Japanese Laid-open Patent Publication No. 2008-88881

Patent Document 2: Japanese Laid-open Patent Publication No. 2007-8416

Incidentally, in the outboard motor described in Patent Document 1, the outside air inlet of an outside air intake space formed by an exterior cover is opened to face rearward, namely, in an opposite direction to the forward direction of the outboard motor. In the outboard motor, regarding in particular intake air, air is taken in against the flow of the air flowing outside the outboard motor. In such a way of taking the intake air, an intake resistance occurs to reduce the intake efficiency, resulting in a decrease in engine output.

Meanwhile, regarding only this point, it is possible to provide the outside air inlet to face forward in order to improve the intake efficiency. However, if the outside air inlet is disposed to face forward in this manner, the spray of water or the like enters from the outside air inlet during traveling of the boat, so that the intake structure cannot be actually realized.

Further, the air taken into the engine cover flows immediately near the engine at a high temperature and is thus heated, and is then sucked into the throttle body and fed to the combustion chamber. The heated intake air is low in filling efficiency (volumetric efficiency), causing problems of affecting the combustion efficiency and further the fuel cost and so on.

SUMMARY OF THE INVENTION

The present invention has been made in view of such a situation, and an object thereof is to provide an outboard motor including an engine cover structure and an intake device which substantially eliminates the intake resistance while preventing intrusion of water to improve the intake efficiency.

An outboard motor of the present invention is an outboard motor including: an exterior cover; an engine room; an engine housed in the engine room formed by the exterior cover; an engine cover covering an upper portion of the exterior cover; and an outside air inlet provided on an upper surface of the engine cover, wherein the outside air inlet is opened to face forward.

Further, the engine cover structure of the outboard motor of the present invention further includes the protruding portion upwardly projecting from the upper surface of the engine cover, wherein the outside air inlet is provided at the protruding portion.

Further, the engine cover structure of the outboard motor of the present invention further includes a step between the upper surface of the engine cover and a bottom end edge of the outside air inlet.

Further, in the engine cover structure of the outboard motor of the present invention, the upper surface of the engine cover located anterior to the outside air inlet is inclined downward to a front.

Further, the engine cover structure of the outboard motor of the present invention further includes a surrounding wall extending to a front around the outside air inlet.

Further, the engine cover structure of the outboard motor of the present invention further includes a joint part between the surrounding wall and the upper surface of the engine cover, the joint part being extended to the front.

Further, in the engine cover structure of the outboard motor of the present invention, the surrounding wall is formed such that an inner wall surface thereof is formed in a substantially linear shape and an outer wall surface thereof is formed in a curved shape protruding outward, and the protruding portion located posterior to the surrounding wall is formed to exhibit a streamlike.

The present invention is an outboard motor further including: a throttle body being provided with an engine; and a separator disposed in an inner space formed within the engine cover, wherein the separator is disposed above the throttle body so as to face to an upstream end thereof.

In the outboard motor, the throttle body is disposed posterior to and away from the outside air inlet.

The outboard motor further includes: wherein a rear end of the protruding portion is located between a front end and a rear end of the separator.

DETAILED DESCRIPTION OF THE PREFERRED EMBODIMENTS

Hereinafter, a preferred embodiment of an outboard motor according to the present invention will be described based on the drawings.

Figure 1:
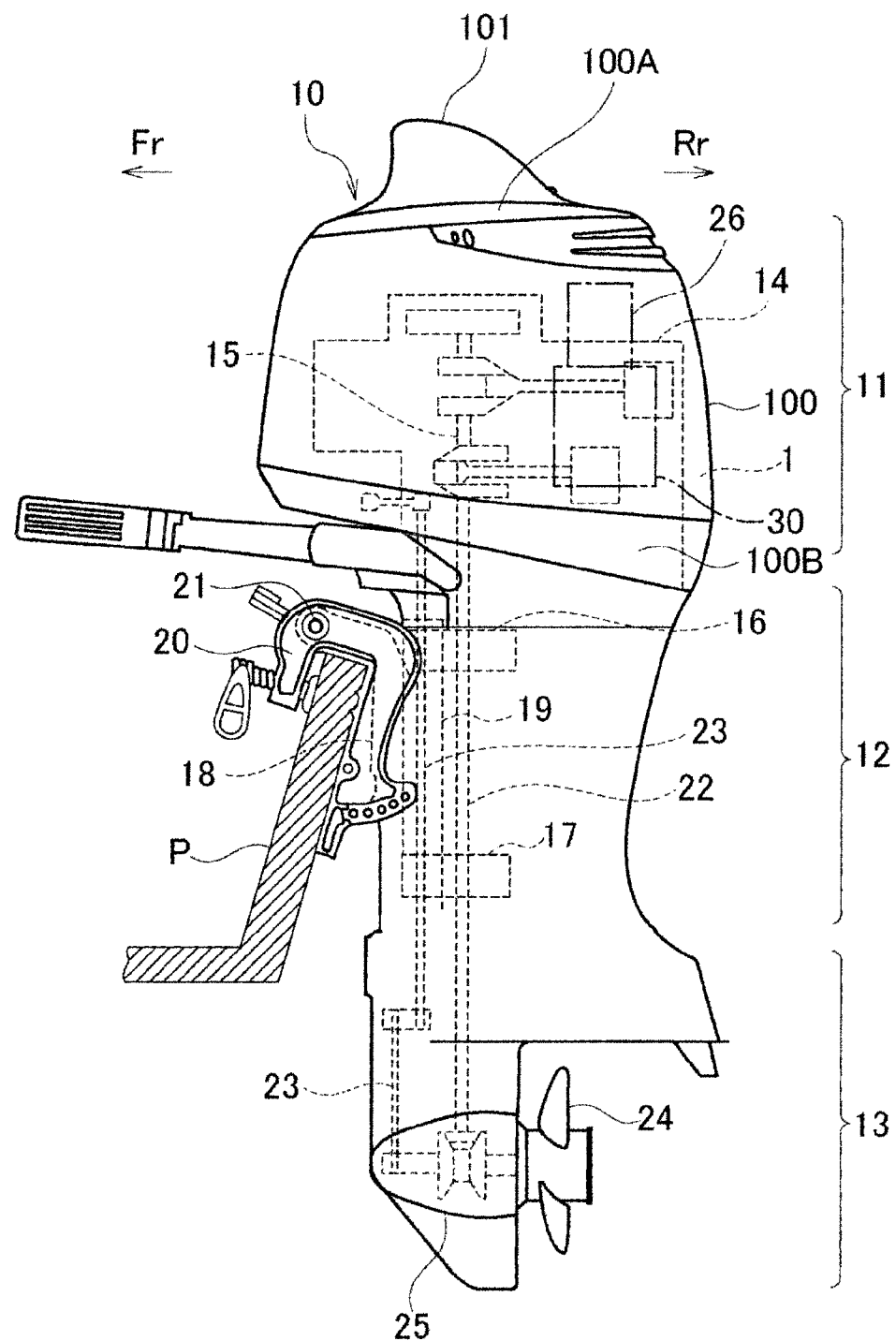
FIG. 1 is a left side view illustrating a schematic whole configuration example of an outboard motor according to an embodiment of the present invention.

FIG. 1 is a left side view illustrating a schematic configuration example of an outboard motor 10 according to the embodiment of the present invention. In this case, the outboard motor 10 is fixed, at its front side, to a rear stern plate P of a hull. Note that in the following description, the front of the outboard motor 10 is indicated by an arrow Fr, the rear is indicated by an arrow Rr, and the right on the side of the outboard motor 10 is indicated by an arrow R and the left on the side is indicated by an arrow L, respectively as necessary in the drawings.

In the whole configuration of the outboard motor 10, an engine unit 11, a middle unit 12, and a lower unit 13 are arranged in order from the top to the bottom. In the engine unit 11, an engine 14 is mounted and supported to be vertically placed, through an engine base, such that its crank shaft 15 is oriented in the vertical direction. Note that, as the engine 14, a multicylinder engine such as a V-six cylinder engine or the like is employable. The middle unit 12 is supported around and integrally rotatable with a supporting shaft 19 set on a swivel bracket 18 through an upper mount 16 and a lower mount 17. On both right and left sides of the swivel bracket 18, a clamp bracket 20 is provided and the outboard motor 10 is fixed to the rear stern plate P of the hull through the clamp bracket 20. The clamp bracket 20 is supported to be rotatable in the top and down direction, around a tilt shaft 21 set in the right and left direction.

In the middle unit 12, a drive shaft 22 coupled to the lower end portion of the crank shaft 15 is disposed to penetrate in the top and down direction, so that the driving force of the drive shaft 22 is transmitted to a later-described propeller shaft in a gear case of the lower unit 13. On the front side of the drive shaft 22, a shift rod 23 for switching between forward and rearward travels and the like is disposed to be parallel to the top and down direction. Note that the middle unit 12 has a drive shaft housing which houses the drive shaft 22. Further, an oil pan storing oil for lubricating the engine unit 11 is disposed in the middle unit 12.

The lower unit 13 has a gear case 25 including a plurality of gears and so on which rotationally drive a propeller 24 by the driving force of the drive shaft 22. The drive shaft 22 extending downward from the middle unit 12 finally rotates the propeller 24 by a gear attached to the drive shaft 22 meshing with the gear in the gear case 25, and the shift rod 23 operates to switch, namely, shift the power transmission path of the gear device in the gear case 25.

Figure 2:
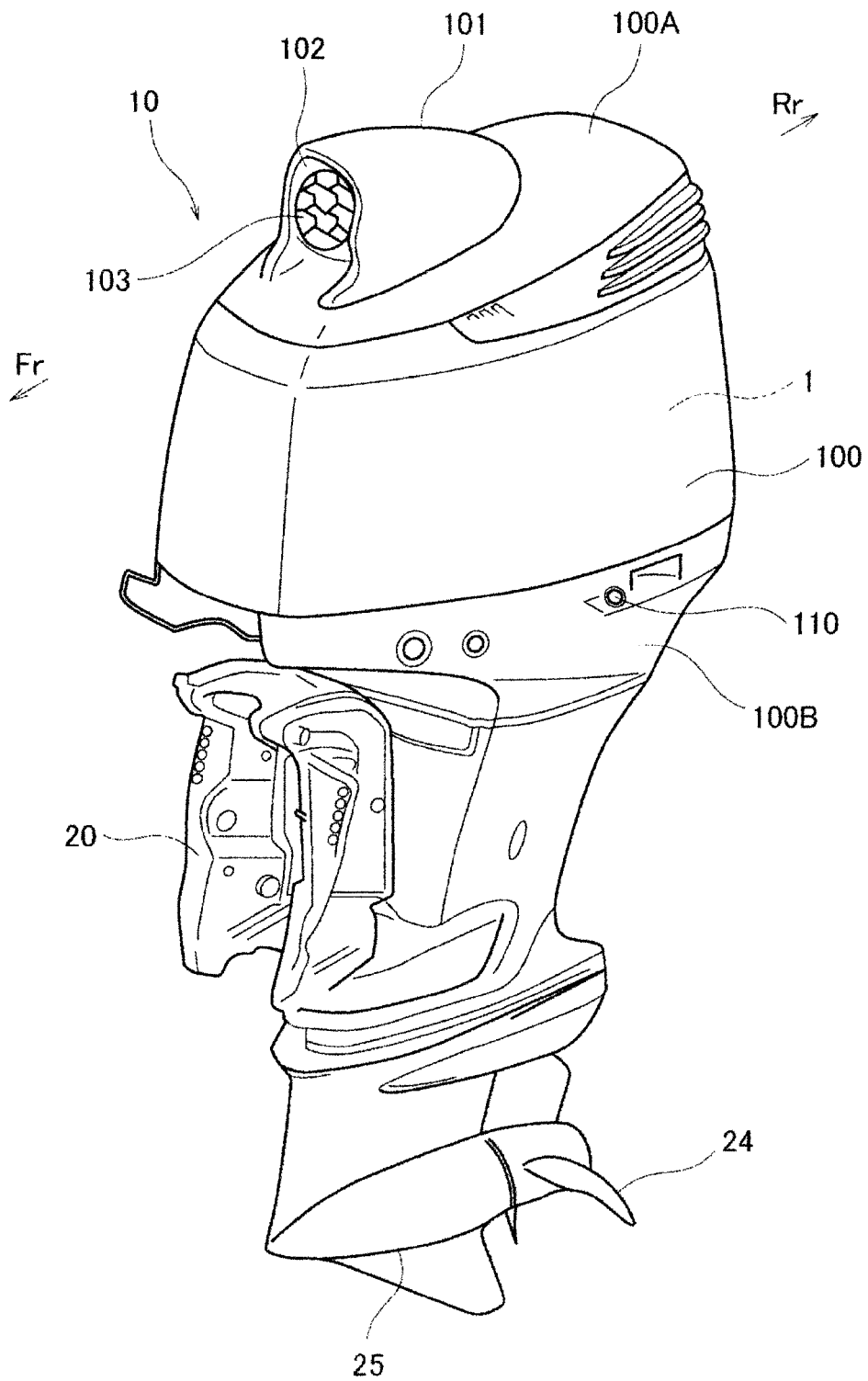
FIG. 2 is a perspective view illustrating an external appearance configuration example of the outboard motor according to the embodiment of the present invention.

The engine unit 11 is housed in an engine room 1 formed by an engine cover 100 that is an exterior cover. The engine cover 100 includes an engine cover 100A constituting an upper cover or a top cover covering an upper portion of the engine unit 11 and an engine cover 100B constituting a bottom cover or a lower cover, which are integrally joined to form an external appearance form such as an almost egg shape or a lemon shape as a whole as illustrated in FIG. 2. The inside of the engine room 1 covered by the engine cover 100 is structured to be sealed and substantially cut off from the outside air.

Here, in the engine unit 11 having the V-six cylinder engine 14 in this embodiment, a cylinder block corresponding to both side portions of the V-shape is disposed to open expanding to the rear with respect to the crank shaft 15 disposed correspondingly to the bottom portion of the V-shape. A throttle body 30 supplying a mixed air to each of the cylinders of the cylinder block is provided with the engine 14. The throttle body is disposed to be held inside the V-shape of the cylinder block of the engine 14. Further, a throttle body coupling pipe or tube 26 connected to an intake port 27 (see FIG. 7) of the throttle body 30 and for feeding the intake air is opened upward near the lower side of the engine cover 100A. The throttle body coupling pipe 26 is disposed at a position closer to the rear end of the engine room 1.

Figure 3:
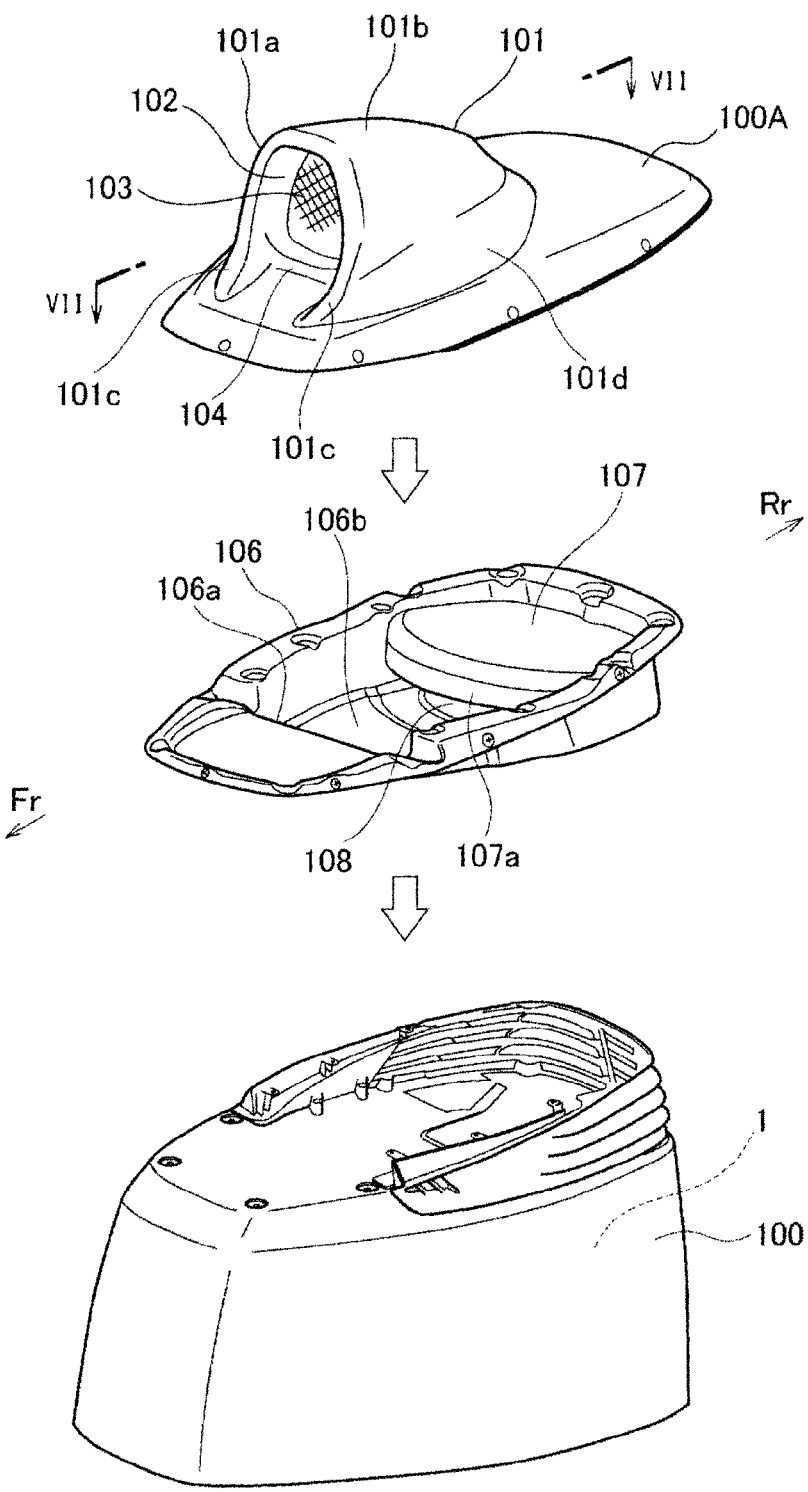
FIG. 3 is an exploded perspective view of a part including an engine cover of the outboard motor according to the embodiment of the present invention.
Figure 4:
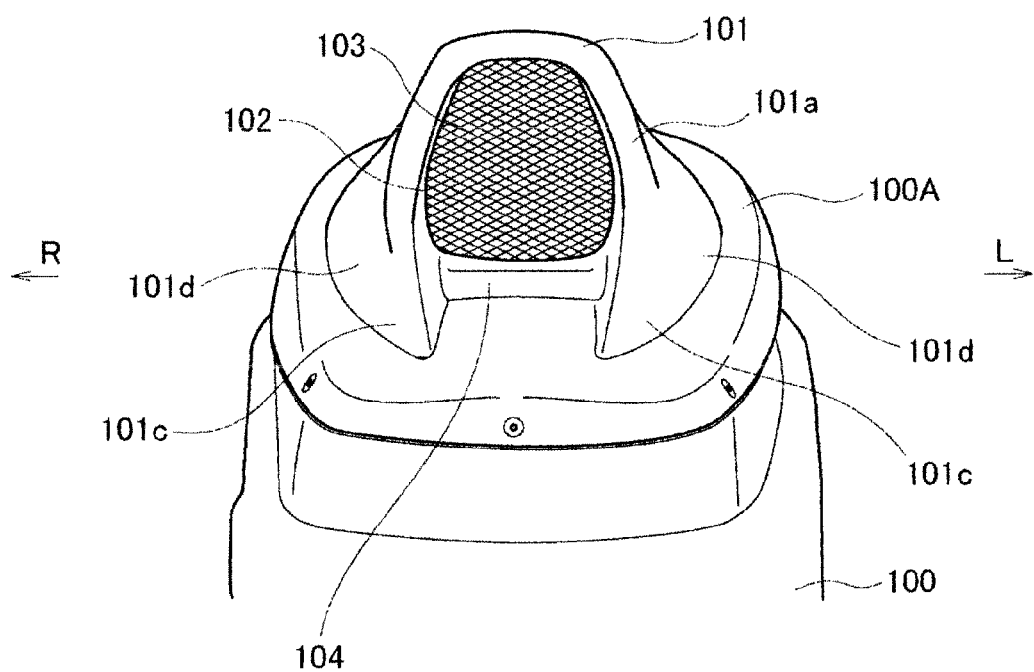
FIG. 4 is a front view of a part including an upper engine cover according to the embodiment of the present invention.
Figure 5:
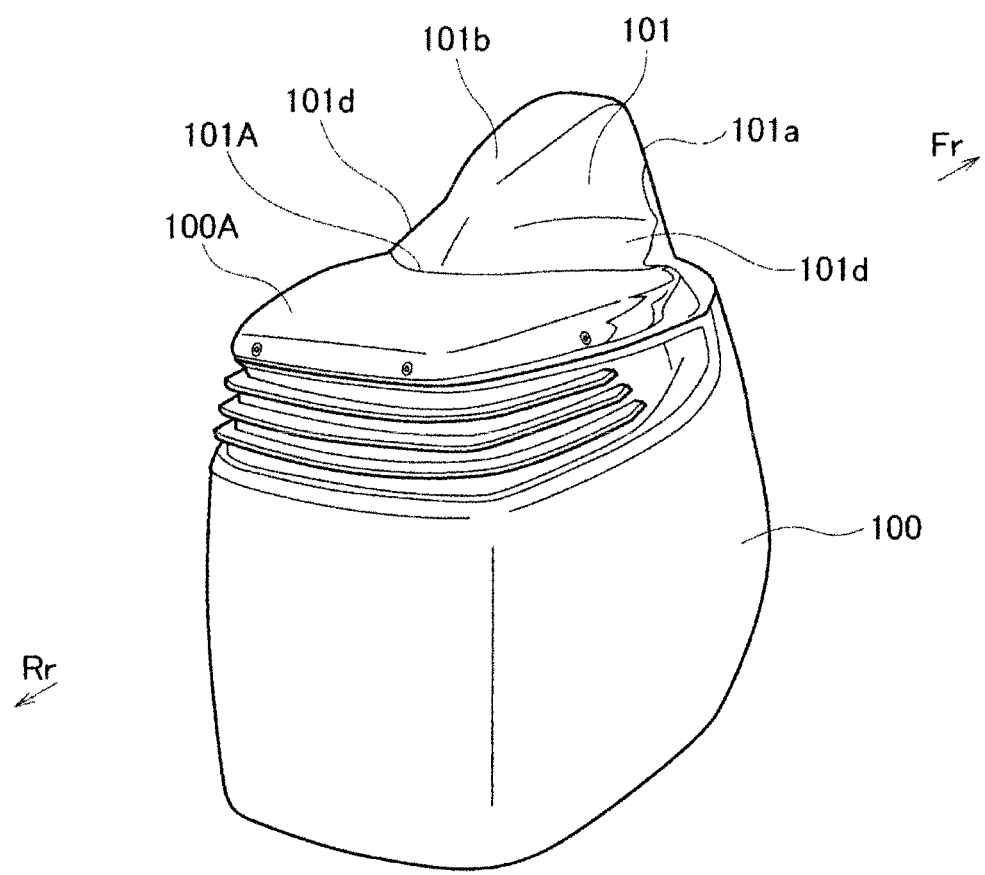
FIG. 5 is a rear perspective view of the part including the upper engine cover according to the embodiment of the present invention.

FIG. 3 to FIG. 5 illustrate a part including the engine cover 100A. The engine cover 100A exhibits an almost elliptical shape or oval shape long in the front and rear direction in a plan view, and is gently curved to protrude upward as a whole. As the material forming the engine cover 100A, for example, carbon fiber reinforced plastics (CFRP) or the like is preferable. In addition, inside the engine cover 100A, an intake device 4 is constituted which is separated from the engine room 1 as will be described later.

An upward projecting protruding portion 101 is provided at a position closer to the front portion on the upper surface of the engine cover 100A. The protruding portion 101 is formed, at its front end rim, in a linear shape in an almost top and down direction in a side view as the whole shape, and has a later-described surrounding wall 101a which rises up almost perpendicularly to the upper surface of the engine cover 100A at the region. The protruding portion 101 similarly has a rear part 101b which gently inclines downward to the rear to exhibit a streamline shape while keeping the curved shape to appropriately protrude upward from the front end of the surrounding wall 101a to the rear in a side view and continues to the upper surface of the engine cover 100A. Further, the protruding portion 101 converges to be gradually decreased in width while keeping the curved shape to appropriately protrude in the right and left direction, from the front end rim formed in an almost linear shape in the right and left direction (the width direction) to the rear in a top view.

At the front portion of the protruding portion 101, an outside air inlet 102 opened to face forward is holed. The forward here is assumed to include not only the direction perpendicular to the right and left direction and the front in the horizontal direction but also a direction appropriately inclined to the top and down and right and left directions with respect to the aforementioned direction. The outside air inlet 102 is, for example, circular and provided at a recessed portion recessed to the rear from the front end of the surrounding wall 101a. Note that a strainer or filter 103 made of appropriate mesh is attached on the outside air inlet 102 to prevent intrusion of foreign matters from the outside. Around the outside air inlet 102, the surrounding wall 101a extending to the front is formed of a part of the protruding portion 101 such that the outside air inlet 102 is disposed to be surrounded by the surrounding wall 101a.

The lower portion of the surrounding wall 101a further extends to the front while appropriately curving in a recessed shape in a side view to form a joint part 101c with the upper surface of the engine cover 100A. A pair of right and left joint parts 101c extends in a manner to slightly decrease in width to the front in a top view while keeping the curved shape appropriately protruding to the right and left direction. Note that other than the case of decreasing in width as described above, the joint parts 101c may be substantially parallel to each other or open slightly expanding to the front.

Further, both right and left outsides continuing from the rear part 101b to the lower portion are formed as flared parts 101d which flare out in a shape protruding outward to surround the periphery of the rear part 101b. The flared parts 101d are formed to smoothly continue from the joint parts 101c formed at the front side.

The engine cover 100A and the protruding portion 101 on its upper surface are generally formed in a curved surface or a curved line in a shape protruding outward with an appropriate R and have a rounded form as a whole. In other words, the engine cover 100A and the protruding portion 101 substantially have no acute portion but have an outer shape suppressing air resistance as much as possible. Further, the protruding portion 101 has therein a hollow structure substantially corresponding to the outer shape so that the inside and the outside of the protruding portion 101 communicate with each other via the outside air inlet 102.

Figure 7:
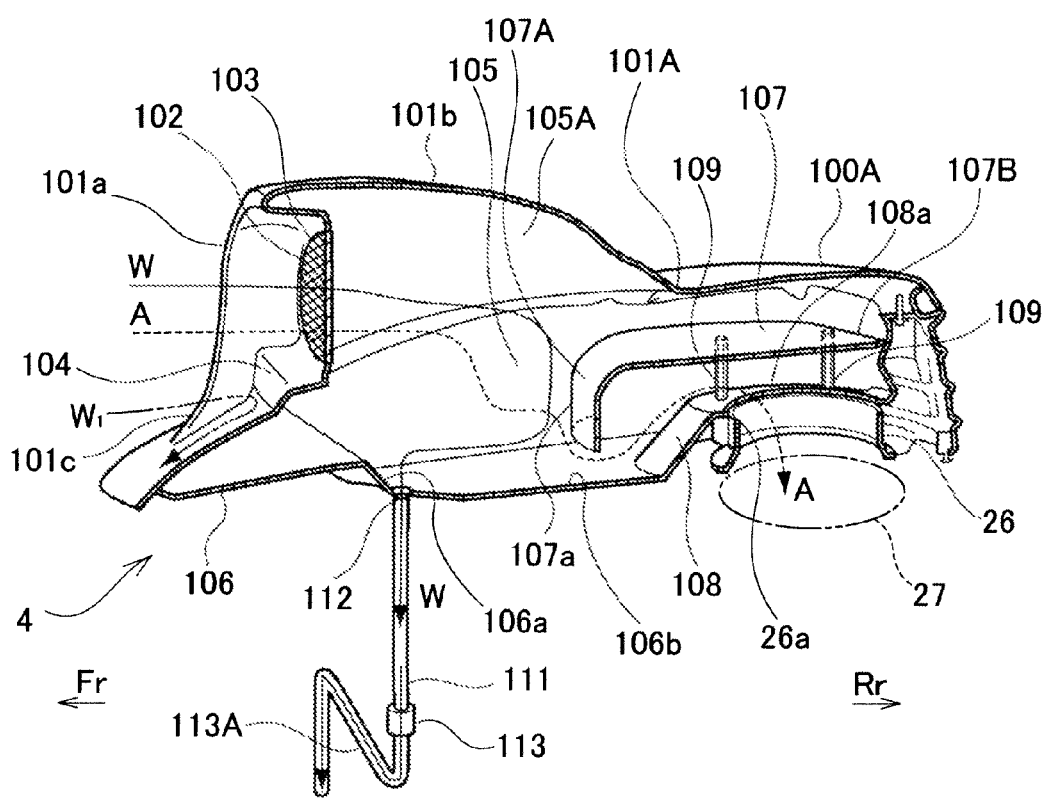
FIG. 7 is a sectional view taken along a VII-VII line in FIG. 3.

In the above case, a stepped part 104 formed by recessing the upper surface of the engine cover 100A is further formed at the front side of the bottom end edge of the outside air inlet 102 illustrated also in FIG. 7 and the like. The upper surface of the engine cover 100A at the front of the stepped part 104 is a gently inclined surface inclined downward to the front.

Further, the surrounding wall 101a extends to the front of the outside air inlet 102 as described above, and its inside (inner wall surface) in the sectional shape has a linear shape, namely, a straight shape such as a column circumferential surface parallel to the cylindrical axis, and its outside (outer wall surface) has a curved shape appropriately protruding outward, which is a shape approximate to, for example, the section of an aircraft wing as a whole.

Figure 6:
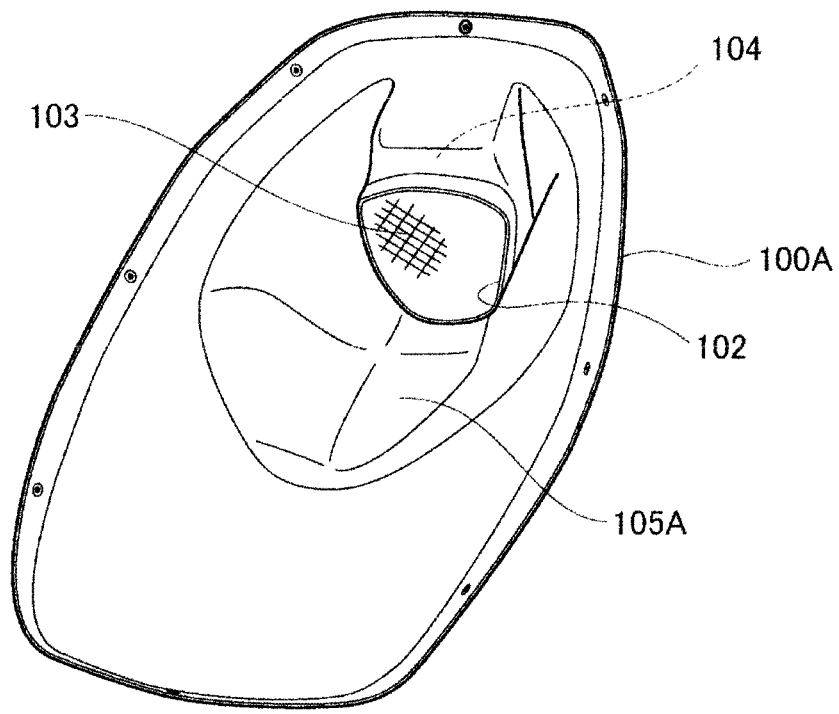
FIG. 6 is a perspective view illustrating the inside of the upper engine cover according to the embodiment of the present invention.
Figure 8:
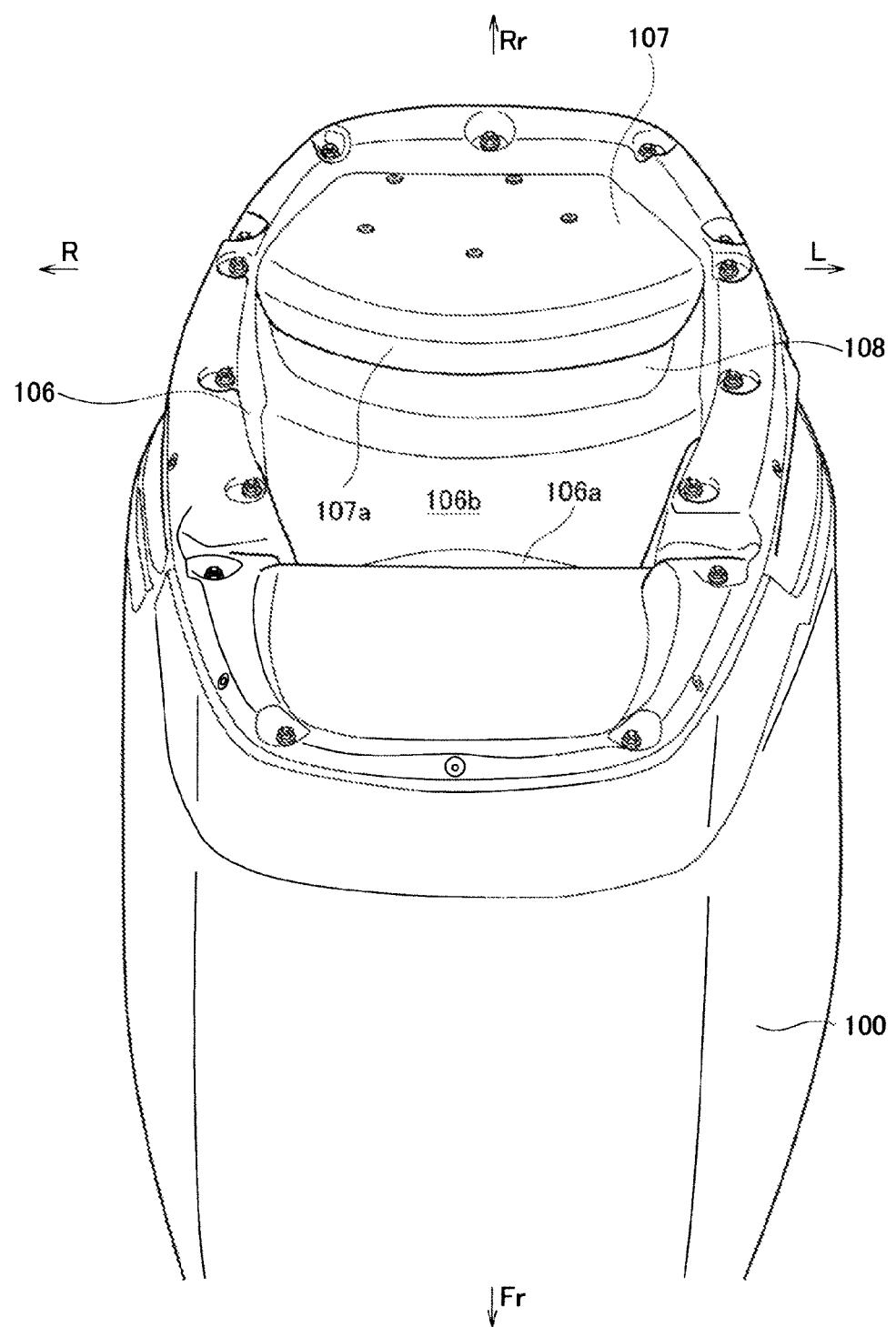
FIG. 8 is a perspective view illustrating a part including an under plate and a separator in the engine cover according to the embodiment of the present invention.

Next, the internal configuration of the engine cover 100A will be described. The engine cover 100A has therein an inner space 105A formed by the protruding portion 101 provided projecting outward as described above as illustrated in FIG. 6. Further, the engine cover 100A closes, along its outer peripheral edge, with an under plate 106 illustrated in FIG. 7 to form an expansion chamber 105 between them including the inner space 105A inside the protruding portion 101. Note that the expansion chamber 105 has an operation of converting the dynamic pressure of air taken in through the outside air inlet 102 to the static pressure. The engine cover 100 body itself here has an open structure in which its upper end is opened. The under plate 106 adheres to the upper end portion of the engine cover 100 body as illustrated in FIG. 8, and the provision of the under plate 106 substantially separates the expansion chamber 105 from the engine room 1 formed inside the engine cover 100. In short, the engine room 1 is substantially formed by the engine cover 100 body.

The under plate 106 is formed in an almost elliptical shape long in the front and rear direction in a plan view similarly to the engine cover 100A, and has a form in an almost dish shape or a flat-bottomed pan shape as a whole. The dish shape is formed to become gradually large in depth toward the rear and has a bottomed structure having a bottom part 106b which becomes substantially horizontal by stepping down via a stepped part 106a. Further, the throttle body coupling pipe 26 is disposed at a position closer to the rear end of the engine room as described above, and a separator 107 is fixedly supported to be disposed corresponding to above the throttle body coupling pipe 26. The separator 107 has a function of preventing water from intruding into the throttle body coupling pipe 26 opening upward, and a skirt part 107a which is molded to bend down along its front end rim hangs down. The skirt part 107a is curved to protrude to the front, for example, in an arc shape or the like in a plan view, and the separator 107 on the rear side of the skirt part 107a adheres to the inner peripheral surface of the under plate 106.

Figure 9:
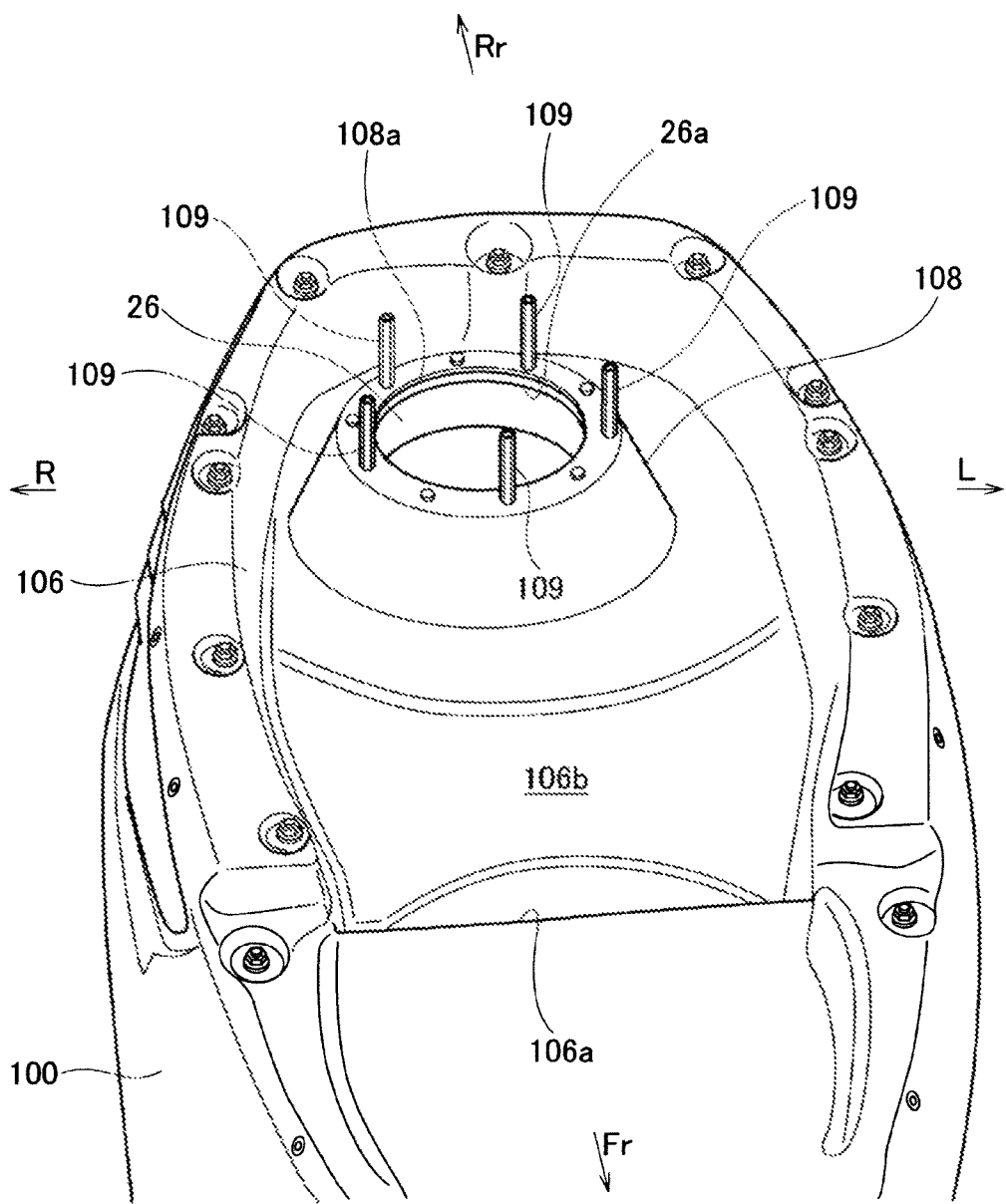
FIG. 9 is a perspective view illustrating a part including the under plate with the separator in the engine cover removed according to the embodiment of the present invention.

FIG. 9 illustrates the state that the separator 107 is removed from the under plate 106. At the bottom part 106b of the under plate 106, a guide table part 108 for guiding air flow is provided which is projectingly provided from the bottom part 106b in a manner to surround the periphery of an upper end opening part 26a of the throttle body coupling pipe 26. The guide table part 108 is formed, for example, in a headless cone shape, and is provided with, at its upper portion, an opening 108a disposed to align with the upper end opening part 26a of the throttle body coupling pipe 26. The peripheral surface of the guide table part 108 is formed as an inclined surface 108b inclined toward the opening 108a.

Further, at the peripheral edge of the opening 108a of the guide table part 108, a plurality of connecting rods 109 are standingly provided for supporting the separator 107. The separator 107 supported by the connecting rod 109 is disposed to be substantially parallel to the bottom part 106b of the under plate 106 above the opening 108a of the guide table part 108 as illustrated in FIG. 7 and the like. In this case, the lower end of the skirt part 107a of the separator 107 is located below the opening 108a of the guide table part 108 as illustrated in FIG. 7. Further, the bottom end edge of the outside air inlet 102 is disposed above the lower end of the skirt part 107a of the separator 107 as illustrated in FIG. 7.

Further, a drainage passage is provided which communicates the inside space of the engine cover 100A separated from the engine room 1 side via the under plate 106, namely, the inside of the expansion chamber 105 and the outside thereof. Concretely, a drainage pipe (or tube) 111 disposed between the bottom part 106b of the under plate 106 and an opening part 110 (see FIG. 2) provided in the engine cover 100B that is the lower cover is provided as illustrated in FIG. 7 so that water is drained via the drainage pipe 111. In this case, the bottom part 106b of the under plate 106 is provided with a drainage hole 112 to which the upper end of the drainage pipe 111 is connected. The drainage hole 112 is disposed at a position that is substantially the lowest region at all times in the bottom part 106b, namely, a position where water can be drained through the drainage hole 112 also in the case when the outboard motor 10 tilts. More concretely, an appropriate position of the bottom part 106b located immediately close to the stepped part 106a of the under plate 106 is preferable.

A backflow prevention mechanism preventing backflow of drainage is provided at a middle of the drainage passage constituted of the drainage pipe 111. As the backflow prevention mechanism, a one-way valve 113 which allows drainage to pass therethrough only in a drainage direction is disposed as illustrated in FIG. 7. Further, a bent part 113A formed by curving, for example, the drainage pipe 111 in an S-shape can be provided in place of the one-way valve 113 as illustrated, or both of them can be used.

The basic operation in the outboard motor 10 configured as described above will be briefly described here. When the engine 14 of the engine unit 11 starts, the drive shaft 22 coupled to the lower end portion of the crank shaft 15 thereof starts to rotate. The shift mechanism is appropriately operated to transmit the driving force of the drive shaft 22 to the propeller shaft of the lower unit 13, whereby the propeller 24 can rotate to cause the outboard motor 10 to drive forward.

In particular, in the flow of the combustion intake air supplied to the engine 14, the boat equipped with the outboard motor 10 travels, whereby outside air first flows thereinto through the outside air inlet 102 provided at the protruding portion 101 of the engine cover 100A. The air taken in through the outside air inlet 102 enters the expansion chamber 105 through the inner space 105A inside the protruding portion 101, enters the lower side of the skirt part 107a of the separator 107 as illustrated by an arrow A in FIG. 7, and is then supplied to the throttle body 30 from the opening 108a of the guide table part 108 and through the upper end opening part 26a of the throttle body coupling pipe 26.

Note that the spray of water, the water contained in the intake air or the like bumps against the separator 107 as illustrated by a solid arrow W in FIG. 7 and is thereby separated into gas and liquid, and drops to the bottom part 106b of the under plate 106. Then, the spray of water, the water contained in the intake air or the like passes from the drainage hole 112 through the drainage pipe 111 and is drained from the opening part 110 of the engine cover 100B to the outside of the outboard motor 10. In other words, even when the water or the like is taken in from the outside air inlet 102, it is never sucked into the throttle body 30 side.

Next, the characteristic operation and effect of the outboard motor 10 will be described. The outside air inlet 102 is first provided on the engine cover 100A covering the upper portion of the outboard motor 10, and the outside air inlet 102 is opened toward the front.

The boat travels as described above to cause outside air to flow therein through the outside air inlet 102 provided at the protruding portion 101 of the engine cover 100A at the upper portion of the outboard motor 10. First, the outside air inlet 102 is opened to face forward, and therefore the traveling air can directly flow therein, resulting in great improvement in the intake efficiency. Since air has conventionally been taken in from the outside air inlet opened toward the rear as described above, the intake efficiency has necessarily decreased. According to the embodiment of the present invention, it becomes possible to overcome the difficulty of suction because of a physical reason such as intake resistance or the like and increase the intake efficiency and eventually the engine output.

Further, the outside air inlet 102 is provided at the protruding portion 101 projectingly provided on the upper surface of the engine cover 100A. By projecting the protruding portion 101 from the upper surface of the engine cover 100A, the air flow bumping against the protruding portion 101 is once received and a stagnation-like state of the air is formed at the outside air inlet 102. The air is basically not in such a stagnation-like state on the outside or near the outer periphery of the outside air inlet 102 and relatively high in flow speed. Therefore, the spray of water or the like gets away from the outside air inlet 102 in a manner to be pulled by the outside air flow that is high in flow speed, so that the effect of preventing intrusion of the sea spray or the like is achieved also in this regard. Opening the outside air inlet 102 toward the front as described above makes it possible to easily take in air while preventing the spray of water or the like other than the intake air from entering the outside air inlet 102, thereby realizing a high intake performance.

Further, the outside air inlet 102 is provided on the upper surface of the engine cover 100A covering the upper portion of the outboard motor 10 and thereby disposed at the highest position in the outboard motor 10. In front of the thus-disposed outside air inlet 102, obstruction and the like with respect to the inflow air are reduced as much as possible and the inflow air flow smooth to the outside air inlet 102 can be obtained. Further, the outside air inlet 102 is disposed at a high location of the outboard motor 10 and thereby disposed at a position much higher than the water surface, thus making it possible to effectively prevent intrusion of the sea spray or the like.

Note that the outside air inlet 102, namely, the protruding portion 101 can be provided not at the upper portion of the outboard motor 10 but on the side surface. In this case, the protruding portion 101 bulges out to the side of the outboard motor 10, so that the outboard motor 10 increases in lateral width when used as it is. For example, particularly even in the case that a plurality of outboard motors 10 are mounted on the hull or the like, the lateral width of the outboard motor 10 itself can be reduced according to the embodiment of the present invention, so that mounting of the plurality of outboard motors 10 can be effectively realized.

Further, the stepped part 104 is provided between the upper surface of the engine cover 100A and the bottom end edge of the outside air inlet 102. In this case, the upper surface of the engine cover 100A at the front of the stepped part 104 is an inclined surface further inclined downward to the front.

Provision of the stepped part 104 forms a so-called weir against the wall surface flow of the sea spray flowing from the front of the outside air inlet 102 along the upper surface of the engine cover 100A and is capable of effectively preventing direct entrance of the sea spray or the like, and thus has a breakwater-like function. Furthermore, the upper surface of the engine cover 100A at the front of the outside air inlet 102 is inclined downward to the front to make a sea spray or the like $W_1$ difficult to rise toward the outside air inlet 102 as illustrated in FIG. 7 and to suppress the sea spray or the like $W_1$ flowing along the upper surface of the engine cover 100A.

Further, the surrounding wall 101a extending to the front is provided around the outside air inlet 102. The outside air inlet 102 is disposed at a recessed position in a duct shape in a manner to be surrounded by the surrounding wall 101a.

By providing the surrounding wall 101a in such a manner, the outside air can be taken in from the recessed position to thereby prevent direct entrance of the sea spray or the like.

In a concrete shape of the surrounding wall 101a, the inner wall surface thereof is typically formed in a substantially linear shape and the outer wall surface thereof is formed in a curved shape protruding outward.

The surrounding wall 101a is formed in such a cross-sectional shape, whereby the outside air is relatively high in flow speed on the outer side and low on the inner side. Therefore, the sea spray or the like flows on the outer side flow high in flow speed to get away from the outside air inlet 102. Accordingly, it is possible to make the sea spray hard to enter the outside air inlet 102. Further, the joint parts 101c and the flared parts 101d are formed to protrude outward to thereby contribute to an increase in flow speed of the outside air as with the surrounding wall 101a.

Further, the joint parts 101c between the surrounding wall 101a and the upper surface of the engine cover 100A are extended to the front.

By providing the joint parts 101c, the surrounding wall 101a including the joint parts 101c has the entire form such that the lower portions are extended more to the front than the upper portion. In other words, by extending or expanding a part of the surrounding wall 101a, the effect of shielding against the sea spray or the like can be further improved.

A configuration such that the outside air flows in from the outside air inlet 102 provided at the protruding portion 101 of the engine cover 100A at the upper portion of the outboard motor 10 as described above makes it possible to substantially eliminate the intake resistance while preventing intrusion of water or the like to improve the intake efficiency.

Further, the intake device 4 feeds and breathe the outside air taken in from the outside air inlet 102 in the space inside the engine cover 100A, namely, the expansion chamber 105 into the throttle body 30. First, in the intake device 4, the outside air inlet 102 is opened to face forward as described above. In particular, the separator 107 is disposed in a manner to cover above the intake port 27 of the throttle body 30 so as to face to the upstream end thereof as illustrated in FIG. 7. Concretely, the separator 107 is supported above the upper end opening part 26a of the throttle body coupling pipe 26 connected to the intake port 27 of the throttle body 30 via the connecting rod 109. In this case, the separator 107 adheres, on its rear portion side, to the inner peripheral surface of the under plate 106.

Since the outside air inlet 102 is opened to face forward, the traveling air can directly flow therein, resulting in great improvement in the intake efficiency. In this case, even if a large quantity of water intrudes from the outside air inlet 102, the water drops to the upper surface of the separator 107 and never directly enters the upper end opening part 26a of the throttle body coupling pipe 26, namely, the intake port 27 of the throttle body 30. In other words, the separator 107 forms a ceiling wall of the intake port 27 of the throttle body 30 to function as a shield plate against the intruded water, thus achieving a high effect of preventing intrusion of water. Note that since the separator 107 adheres, on its rear portion side, to the inner peripheral surface of the under plate 106, water never intrudes from the rear portion side of the separator 107.

Further, the throttle body 30 is disposed posterior to and away from the outside air inlet 102. More specifically, the outside air inlet 102 is disposed at a position closer to the front portion on the engine cover 100A, whereas the throttle body 30 and, accordingly, the throttle body coupling pipe 26 is disposed at a position closer to the rear portion of the engine room 1.

A long separation distance between the throttle body 30 and the outside air inlet 102 is secured and the flow path for intake air thus increases according to the separation distance, thereby facilitating separation of the water contained in the intake air and making it possible to effectively prevent intrusion of water to the throttle body 30 side also in this regard. Further, as the separation distance between them becomes longer, the volume of the expansion chamber 105 is made larger, whereby the efficiency of filling the intake air can be enhanced.

Further, the outside air inlet 102 is provided at the protruding portion 101 projectingly provided on the upper surface of the engine cover 100A covering the upper portion of the outboard motor 10, and a rear end 101A (see FIG. 5, FIG. 7 and so on) of the protruding portion 101 is located between a front end 107A and a rear end 107B of the separator 107.

Setting the positional relation of the separator 107 with respect to the protruding portion 101 as described above ensures that even when a large quantity of water intrudes from the outside air inlet 102, the water can surely drop to the upper surface of the separator 107 similarly to the above case.

For example, if the rear end 101A of the protruding portion 101 is located anterior to the front end 107A of the separator 107, namely, not located above the separator 107, a large quantity of water intruded from the outside air inlet 102 sometimes directly drops to the bottom part 106b of the under plate 106. When the water drops in this manner, the spray of the waiter is assumed to directly enter the upper end opening part 26a of the throttle body coupling pipe 26. In the embodiment of the present invention, locating the rear end 101A of the protruding portion 101 above the separator 107 eliminates occurrence of such a problem.

The present invention has been described above together with various embodiments, but the present invention is not limited to the above-describe embodiments and may be modified within the scope of the present invention.

Though an example in which a single protruding portion 101 and a single outside air inlet 102 are provided has been described in the above embodiment, a plurality of, two or more, outside air inlets 102 which are similarly configured can also be provided.

According to the present invention, a protruding portion is projectingly provided on the upper surface of an engine cover at the upper portion of an outboard motor, and outside air flows therein from an outside air inlet provided at the protruding portion. Taking in the outside air in this manner makes it possible to substantially eliminate the intake resistance while preventing intrusion of water or the like to improve the intake efficiency. Further, according to the present invention, since the outside air inlet is opened to face forward, the traveling air can directly flow therein, resulting in great improvement in the intake efficiency. In this case, even if a large quantity of water intrudes from the outside air inlet, the water drops to the upper surface of the separator and never directly enters the intake port of the throttle body. In short, the separator can function as a shield plate against the intruded water, thus achieving a high effect of preventing intrusion of water.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

What is claimed is:
1. An outboard motor, comprising:
an exterior cover;
an engine room;
an engine housed in said engine room formed by said exterior cover;
an engine cover covering an upper portion of said outboard motor and having a protruding portion upwardly projecting from an upper surface thereof, said protruding portion being formed with an expansion chamber separating an inner space thereof from said engine room in which said engine is housed, and formed with an outside air inlet opened to face forward;
a throttle body of said engine provided with an intake port;
a throttle body coupling pipe, wherein said expansion chamber and said intake port of said throttle body are coupled by said throttle body coupling pipe;
a protruding portion upwardly projecting from the upper surface of said engine cover, wherein said outside air inlet is provided at said protruding portion;
a step between the upper surface of said engine cover and a bottom end edge of said outside air inlet, wherein the upper surface of said engine cover located anterior to said outside air inlet is inclined downward to a front; and
a surrounding wall extending to a front around said outside air inlet.
2. The outboard motor according to claim 1,
wherein said surrounding wall is formed such that an inner wall surface thereof is formed in a substantially linear shape and an outer wall surface thereof is formed in a curved shape protruding outward, and wherein said protruding portion located posterior to said surrounding wall is formed to exhibit a streamline.

3. The outboard motor according to claim 1, further comprising:
a joint part between said surrounding wall and the upper surface of said engine cover, said joint part being extended to the front.

4. The outboard motor according to claim 1, further comprising:
a separator provided in said expansion chamber to cover above said intake port of said throttle body,
wherein a rear end of said protruding portion upwardly projecting from the upper surface of said engine cover to form said expansion chamber is located between a front end and a rear end of said separator.

5. The outboard motor according to claim 4,
wherein said intake port of said throttle body is disposed posterior to and away from said outside air inlet.

6. The outboard motor according to claim 1,
wherein said outside air inlet is provided on top of the upper surface of said engine cover.

7. The outboard motor according to claim 1,
wherein the step between the upper surface of said engine cover and the bottom end edge of said outside air inlet is recessed toward a rearward of the outboard motor.

* * * * *